(12) United States Patent
Lane

(10) Patent No.: US 10,555,847 B2
(45) Date of Patent: Feb. 11, 2020

(54) MULTI-FUNCTION CHAIR ATTACHMENT FOR DISABLED PERSONS

(71) Applicant: Greg Lane, Knoxville, TN (US)

(72) Inventor: Greg Lane, Knoxville, TN (US)

( * ) Notice: Subject to any disclaimer, the term of this patent is extended or adjusted under 35 U.S.C. 154(b) by 0 days.

(21) Appl. No.: 16/006,269

(22) Filed: Jun. 12, 2018

(65) Prior Publication Data

US 2018/0353357 A1 Dec. 13, 2018

Related U.S. Application Data

(60) Provisional application No. 62/518,044, filed on Jun. 12, 2017.

(51) Int. Cl.
| | | |
|---|---|---|
| *A61G 5/10* | (2006.01) |
| *A01K 97/10* | (2006.01) |
| *A01M 31/02* | (2006.01) |
| *A47C 7/62* | (2006.01) |
| *F16M 13/02* | (2006.01) |

(52) U.S. Cl.
CPC ............ *A61G 5/10* (2013.01); *A01K 97/10* (2013.01); *A01M 31/02* (2013.01); *A47C 7/62* (2013.01); *F16M 13/022* (2013.01); *F16M 2200/06* (2013.01)

(58) Field of Classification Search
CPC .... F16M 13/022; F16M 2200/06; A61G 5/10; A01K 97/10; A01M 31/02; A47C 7/62; A47C 7/622; A47C 7/624
USPC ...................................................... 297/188.2
See application file for complete search history.

(56) References Cited

U.S. PATENT DOCUMENTS

| | | | | |
|---|---|---|---|---|
| 4,112,607 A * | 9/1978 | Scher ..................... | A01K 97/10 |
| | | | 43/17 |
| 5,325,620 A * | 7/1994 | Reed ...................... | A01K 97/10 |
| | | | 211/70.8 |
| 5,560,137 A * | 10/1996 | Herring .................. | A01K 97/10 |
| | | | 248/514 |
| 6,227,510 B1* | 5/2001 | McMullen, Sr. ........ | A47C 7/68 |
| | | | 248/230.5 |
| 6,808,231 B1* | 10/2004 | Hill .......................... | B60R 9/06 |
| | | | 296/26.09 |
| 7,047,688 B2* | 5/2006 | Sandman, Jr. .......... | A01K 97/10 |
| | | | 248/512 |
| 7,533,931 B1* | 5/2009 | Bryant, Sr. .............. | A47C 7/62 |
| | | | 297/188.08 |
| 7,559,171 B2* | 7/2009 | Bateman ................ | A01K 97/10 |
| | | | 248/514 |
| 9,532,559 B1* | 1/2017 | Hemmerlin ............ | A01K 97/10 |
| 2010/0026057 A1* | 2/2010 | Miller ...................... | A47C 4/22 |
| | | | 297/21 |
| 2015/0289494 A1* | 10/2015 | Davis ..................... | A01K 97/04 |
| | | | 43/55 |

(Continued)

*Primary Examiner* — Mark R Wendell
(74) *Attorney, Agent, or Firm* — Pitts & Lake, P.C.

(57) ABSTRACT

A multi-function attachment to assist a user to perform one or more tasks, the attachment including an arm member having forward and back ends, one or more coupling members provided to the arm member and configured to detachable secure the arm member to a chair, and a support member configured to be detachably coupled to the second end of the arm member; wherein at least a portion of the support member is configured to extend laterally from a point proximate the front end of the arm member to provide support for a device forward and above a seat portion of the chair.

2 Claims, 4 Drawing Sheets

(56) References Cited

U.S. PATENT DOCUMENTS

2019/0004404 A1\* 1/2019 Buttimer .............. G03B 17/561
2019/0118908 A1\* 4/2019 Hernandez .............. B63B 17/02

\* cited by examiner

MULTI-FUNCTION CHAIR ATTACHMENT FOR DISABLED PERSONS

CROSS-REFERENCE TO RELATED APPLICATIONS

This application claims the benefit of U.S. Provisional Patent Application Ser. No. 62/518,044, filed on Jun. 12, 2017, which is incorporated herein in its entirety by reference.

FIELD OF INVENTION

The present general inventive concept relates to a device for assisting disabled persons, and, more particularly, to a multi-function attachment for a chair to assist disabled persons with various tasks.

BACKGROUND

Numerous examples exist in which an individual may desire or require assistance in performing simple tasks with one or more of the individual's hands. For example, one instance is known in which an individual suffered a stroke, and, as a result, lost substantially all movement of the individual's left hand, and at least partial movement of the individual's left leg. Prior to the stroke, the individual was an avid hunter and fisherman, and had served a distinguished career in the United States Navy. However, because hunting and fishing both typically require the use of both hands, as a result of the loss of movement from the stroke the individual could no longer engage in these activities without significant assistance. Thus, the loss of movement resulting from the stroke was debilitating to the individual and resulted in a significant change in lifestyle.

In instances such as those of the above-discussed individual, it is desirable to have one or more devices which assist the user in performing tasks that could otherwise have been performed by the user's hands. Likewise, in various instances, it may be desirable for a non-disabled person to have a device which assists in performing various tasks, so that one or more hands may be used in other various tasks. For example, in the case of fishing, it may be desirable to have a device which will allow a user, whether disabled or not, to perform the various tasks associated with fishing one-handed, either to assist with a disability of the user or to allow the user to free up one hand for other tasks.

Various conventional devices exist for assisting a user in performing tasks such as hunting and fishing. For example, so-called "angler's chairs" exist which consist of a chair having a mount for holding a fishing pole secured thereto. Such angler's chairs are commonly found, for example, mounted to the deck of a fishing boat. However, in such conventional angler's chairs, the mount for holding a fishing pole is typically permanently fixed to the chair, and in many cases, the chair is permanently fixed to the deck of the fishing boat. Also, many conventional angler's chairs may only be used in fishing, and are of little value in performing other tasks, such as hunting, for example. Thus, these devices are not readily portable and cannot be taken with the user to assist in various other tasks in the user's life. Likewise, so-called "bench rest" devices exist which allow a user to support a hunting rifle or other firearm thereon and which could, in theory, be used to load, aim, and fire a firearm one-handed. However, again, such bench rest devices typically are of little value in performing other tasks, and are not readily adaptable to assist a user in various tasks in the user's life.

In light of the above, there is a need in the art for a multi-function attachment for a chair, standing station, or the like, which is useful in assisting disabled persons in performing various tasks. There is further need in the art for a chair incorporating such an attachment.

BRIEF SUMMARY

According to various example embodiments of the present general inventive concept, an assistance tool is attachable to a chair or other stationary object to assist a user in performing an activity by providing support for a device in an easy and convenient manner. The assistance tool may be adjustable to different positions to aid with different types of users and uses.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a multi-function attachment to assist a user to perform one or more tasks, the attachment including an arm member having forward and back ends, one or more coupling members provided to the arm member and configured to detachable secure the arm member to a chair, and a support member configured to be detachably coupled to the second end of the arm member; wherein at least a portion of the support member is configured to extend laterally from a point proximate the front end of the arm member to provide support for a device forward and above a seat portion of the chair.

The foregoing and/or other aspects and advantages of the present general inventive concept may also be achieved by providing a multi-function attachment for assisting in the performance of one or more tasks, said attachment including an arm member including a first end securable to a chair and a second end which is positionally adjustable in relation to the first end to position the second end proximate a user-positioning location of the chair, and at least one device securable to the arm member second end such that the device may be positioned above and forward of the user-positioning location of the chair for ready access by a user positioned at the location, the device being configured to assist a user in performing a task.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
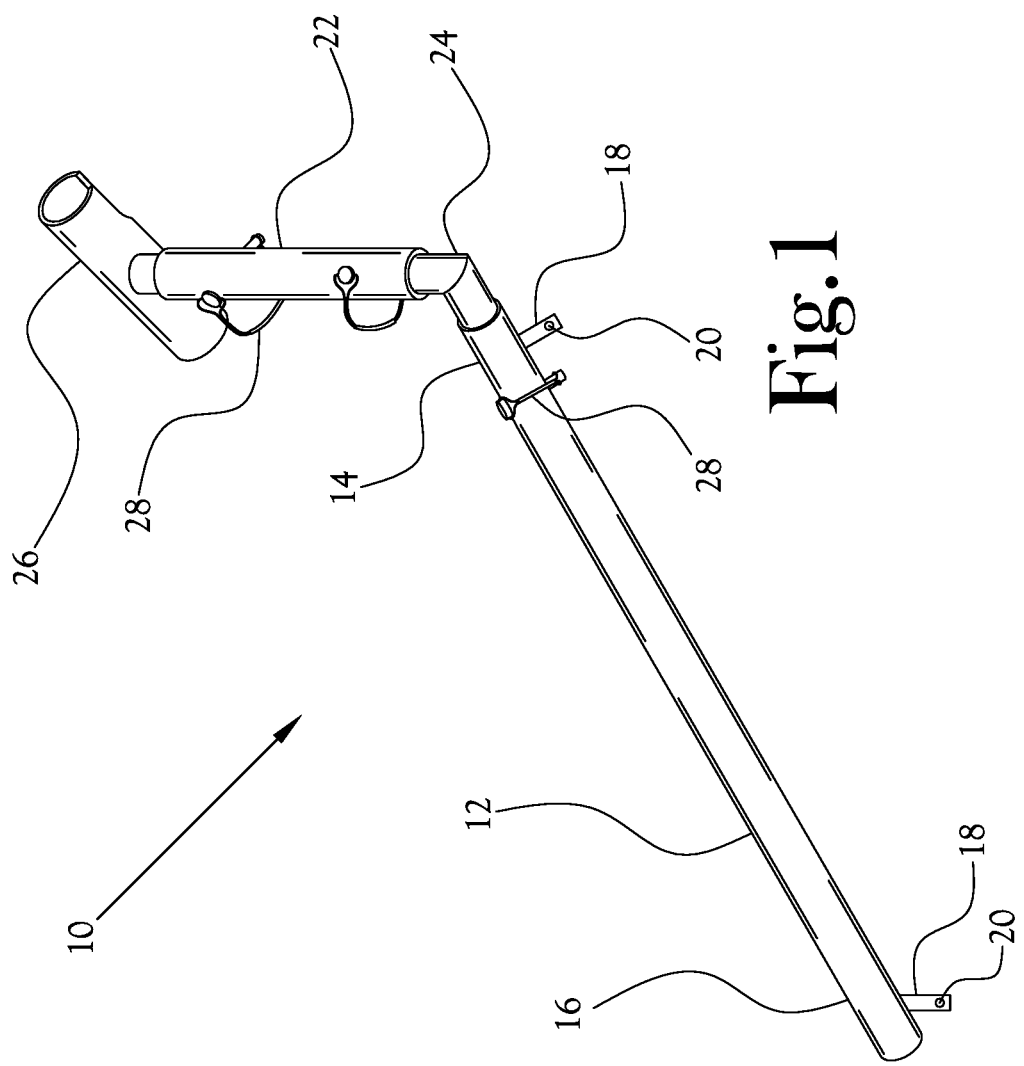
FIG. 1 illustrates a multi-function attachment according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, an assistance tool is attachable to a chair or other stationary object to assist a user in performing an activity by providing support for a device in an easy and convenient manner. The assistance tool may be adjustable to different positions to aid with different types of users and uses. Various example embodiments of the present general inventive concept provide a multi-function attachment for a chair or other sitting station, a standing station, such as for example a countertop, railing, podium, or the like, which is useful in assisting a user in performing various tasks, such as for example hunting, fishing, or the like. As used herein, the term "chair" is meant to refer to any such sitting or standing station in which a person may sit or stand to perform the aforementioned various tasks, and may include, by way of example, a folding chair or other chair, a bench, stool, couch, or the like, and may also include, by way of example, a table, counter, railing, or the like, such as for example a railing along a dock or pier, or along a porch or patio. For simplicity of terminology, the term "chair" is used herein, but it will be understood that the multi-function attachment described herein may be used with any such sitting or standing station, among others. In the various illustrated embodiments discussed herein, the multi-function attachment is attached to the substantially tubular frame of a standard collapsible camping chair, but it is understood that the multi-function attachment is not limited to such use.

The multi-function attachment, or "attachment," comprises generally an elongated arm member which is configured to be attached to a chair via at least one clamp, and preferably a plurality of clamps, and to extend therefrom to a region generally in front of a user seated in the chair (or in the case of a standing station, to a region generally in front of a user standing at the station). A distal end of the arm member is provided with a support member that carries at least one device, and preferably a plurality of devices, which may be used to assist a user in performing one or more tasks, such as for example hunting, fishing, or the like. Thus, when the arm member is attached to a chair and a user is seated therein, the arm member positions the at least one device generally in front of the user, such that the user may employ the device. In various embodiments, at least one of the devices is removable and interchangeable with another device, such that the attachment may be reconfigured to assist in various different tasks. Furthermore, in various embodiments, the arm member and/or support member is adjustable, such that the positioning of at least one of the devices in relation to the chair may be adjusted, thereby allowing for adjustment of the positioning of the at least one device in relation to the user seated in the chair.

FIG. 1 illustrates a multi-function attachment according to an example embodiment of the present general inventive concept. The example embodiment attachment 10 illustrated in FIG. 1 is an assembly of several modular pieces that are designed to be easily connected and disconnected so that storage is simple, and requires less space. In various other example embodiments of the present general inventive concept, two or more of the modular pieces discussed herein may be formed as one piece. The attachment 10 includes an arm member 12 having a front end 14 and a back end 16 which correspond generally to the front and rear of the chair to which it is configured to attach. The arm member 12 is provided with two coupling members 18 used to couple the arm member 12 to the chair, and each of the coupling members 18 is formed with a through hole 20 so that a clamp or other such securing member can be coupled to the coupling members 18 and clamped to a portion of the chair. In various example embodiment of the present general inventive concept more or fewer coupling members 18 may be provided to the arm member 12, and may be located in different positions. In the example embodiment illustrated in FIG. 1, the coupling member 18 at the rear end 16 of the arm member 12 is oriented substantially vertically to more easily interact with a clamping member clamped to a vertical frame portion of the chair, whereas the coupling member 18 at the front end 14 of the arm member 12 extends in a substantially perpendicular direction from the arm member 12. A support member 22 extends laterally from a point proximate the front end 14 of the arm member 12 to provide support for a device or device holder forward and above a seat portion of the chair. In various example embodiments of the present general inventive concept, the support member 22 may itself provide support for an activity device, or may be coupled to a more specialized device holder that is configured to hold one or more portions of a specific device or that is configured to hold many general devices. A positioning insert 24, which is formed in a substantially L-shape, has a first end formed so as to be inserted inside the front end 14 of the arm member 12, and a second end formed so as to be inserted in the support member 22 to couple the support member 22 to the arm member 12. A device holder 26 is coupled to the support member 22 to hold various different devices. In the example embodiment illustrated in FIG. 1, the device holder 26 is configured to hold a handle of a fishing rod. A plurality of attachment members 28 are provided to couple the various modular pieces of the attachment 10 together, and will be further describe in relation to FIG. 2 herein. In this example embodiment, the attachment members 28 are wire round lock pins, but various other example embodiments of the present general inventive concept may utilize other types of pins or coupling mechanisms to keep the components of the attachment 10 connected and in the desired configuration.

Figure 2:
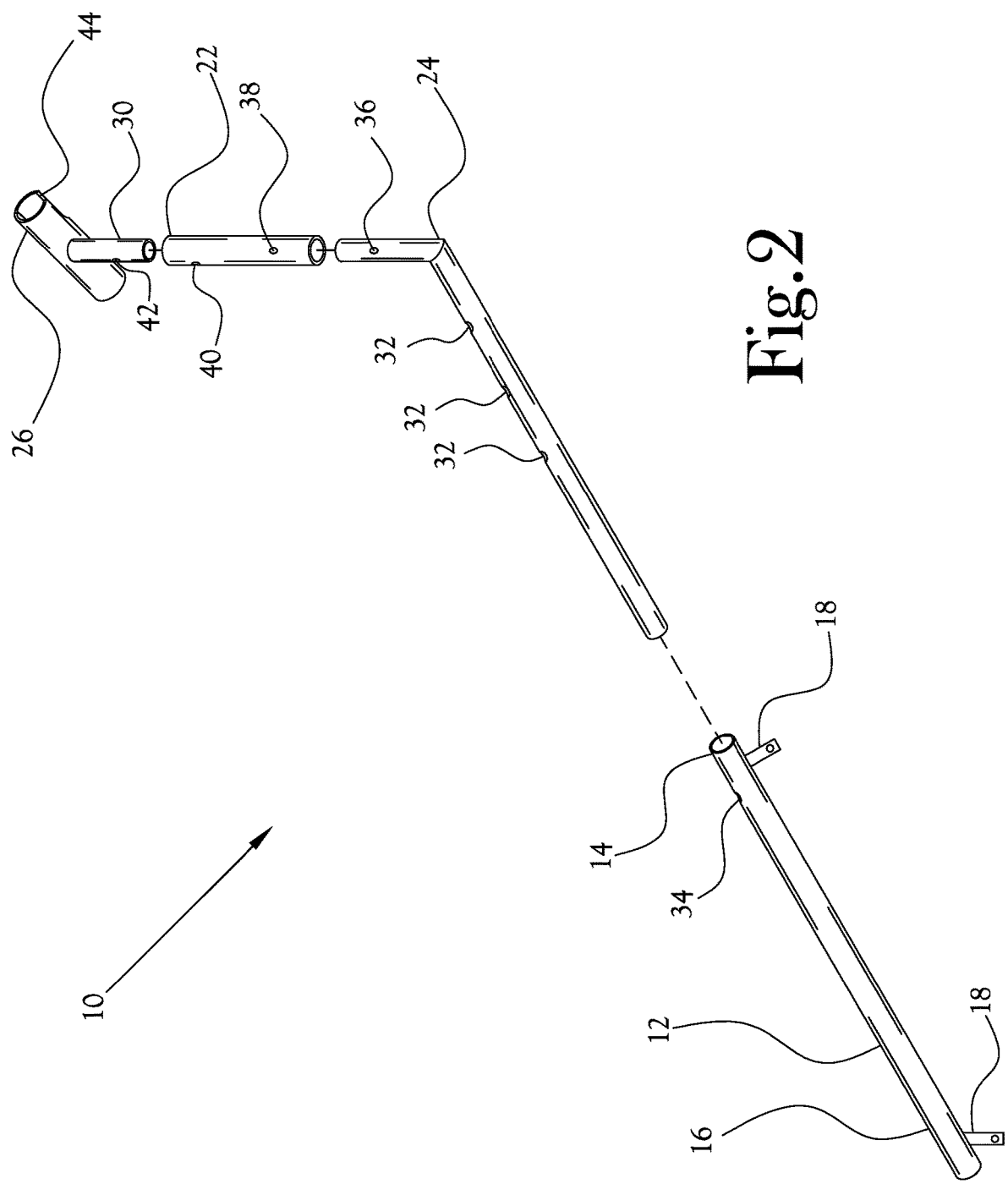
FIG. 2 illustrates an exploded view of the multi-function attachment of FIG. 1.

FIG. 2 illustrates an exploded view of the multi-function attachment of FIG. 1. As illustrated in FIG. 2, the first portion of the positioning insert 24 is elongated and configured to be slid into the forward end 14 of the arm member 12 to various depths to change the position of the support member 22 relative to the rear end 16 of the arm member 12. A plurality of pairs of through holes 32 are formed along a length of this first portion, and a pair of through holes 34 are formed proximate the front end 14 of the arm member so as to correspond to any of the pairs of through holes 32 in the positioning insert 24. Each pair of through holes are respectively formed opposite one another, and a user can adjust the position of the positioning insert 24 by aligning one of the pairs of through holes 32 with the through holes 34 in the arm member 12, and then inserting an attachment member such as a lock pin to hold the desired length of the combined arm member 12 and positioning member 24. While this illustrated example embodiment employs through holes and lock pins, various other attachment configurations may be used in other example embodiments. For example, spring-loaded push buttons may be used in place of the through holes 32 in the positioning member 24, such that the push buttons pop into the through holes 34 in the arm member 12 to hold the position of the positioning member 24. In still other example embodiments, a simple slip fit may be employed rather than an adjustable length with the described securing components. As illustrated in FIG. 2, a second portion of the positioning member 24 is formed to be inserted into one end of the support member 22, and at least one pair of through holes 36 are provided on the positioning member 24 to correspond to a pair of through holes 38 in the support member 22 to receive an attachment member to hold the pieces in position relative to one another. The device holder 26 is provided with an inserting member 30 that extends away from the device holder 26 so as to be inserted into another end of the support member 22 so that various devices may be secured thereto. In this example embodiment, the support member is provided with a pair of through holes 40 that correspond to a pair of through holes 42 formed on the inserting member 30 to receive a pin 28 or other such attachment member to secure the device holder 26 to the support member 22. In various example embodiments, a plurality of pairs of through holes 42 and/or 40 may be provided such that the device holder can be rotated around an axis of the support member 22 to a desired position for the device holder 26. In the example embodiment illustrated in FIG. 2, the device holder 26 is formed to receive the handle of a fishing rod, and a notch 44 is formed in a forward end of the device holder 26 to receive a portion of a reel attachment to hold the fishing rod in place. As can be seen by the exploded view of this example embodiment illustrated in FIG. 2, the several components of the attachment 10 may be quickly and easily assembled for attachment to a chair or other station, and quickly and easily disassembled and stored due to the manageable size and configuration of the components.

Figure 3:
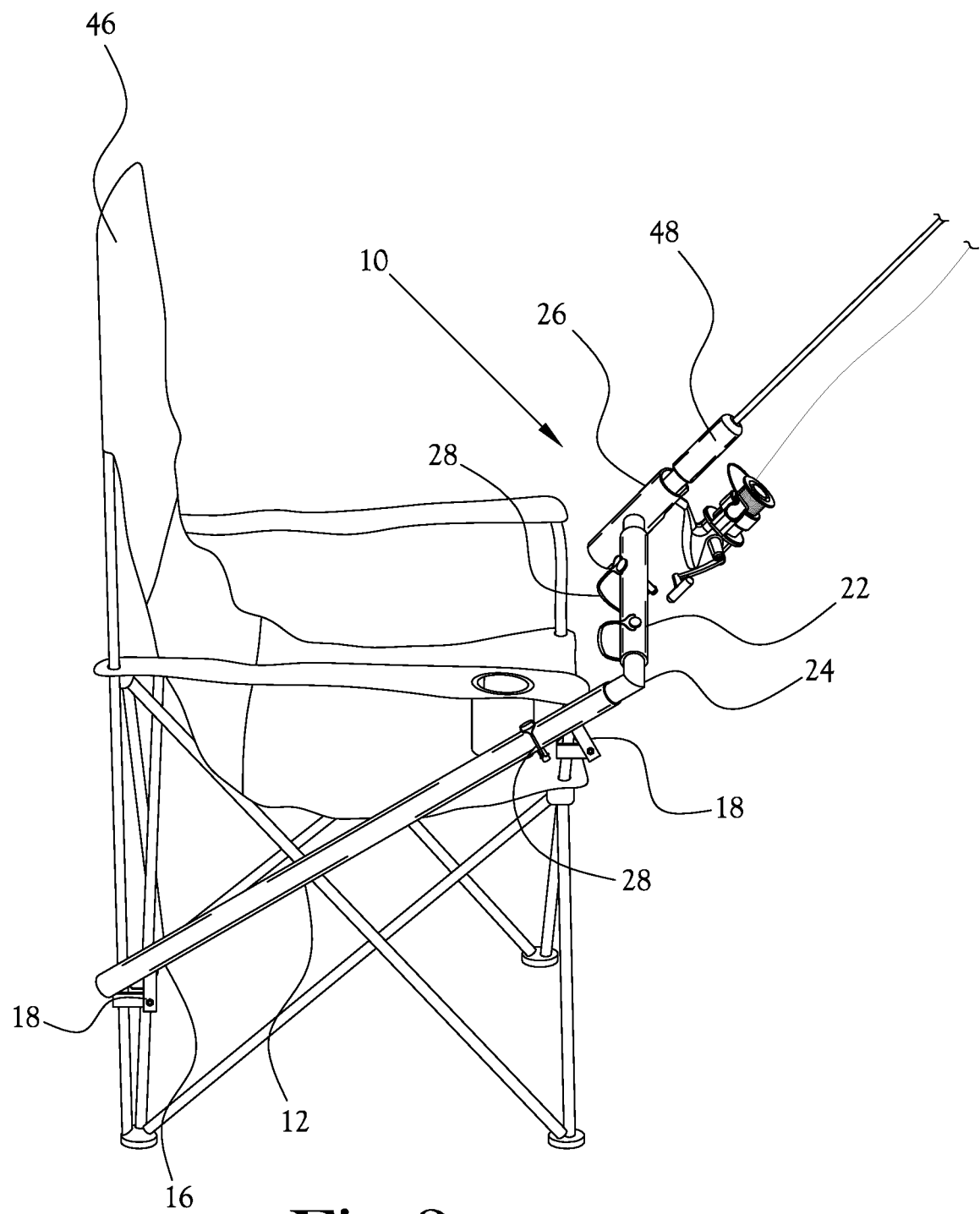
FIG. 3 illustrates the multi-function attachment of FIG. 1 attached to a camping chair according to an example embodiment of the present general inventive concept.

FIG. 3 illustrates the multi-function attachment of FIG. 1 attached to a camping chair according to an example embodiment of the present general inventive concept. While a conventional camping chair 46 is illustrated with the attachment 10 in FIG. 3, it is understood that the attachment 10 used with a plurality of other folding or non-folding chairs, as well as other types of stations. Also, in various example embodiments of the present general inventive concept the attachment 10 can be attached and used on either side of the chair 46, such as by simply reversing the connections of the clamping members described herein. Thus, the attachment 10 can be used on either the right or left side of the chair 46. In FIG. 3 the arm member 12 is attached to the chair 46 at a back frame member and a forward frame member, and a fishing rod 48 is held in place in the device holder 26. With such an arrangement, a user is able to sit comfortably and fish while using one arm/hand, and can rest that arm/hand on the support member 22 for increased comfort.

Figure 4:
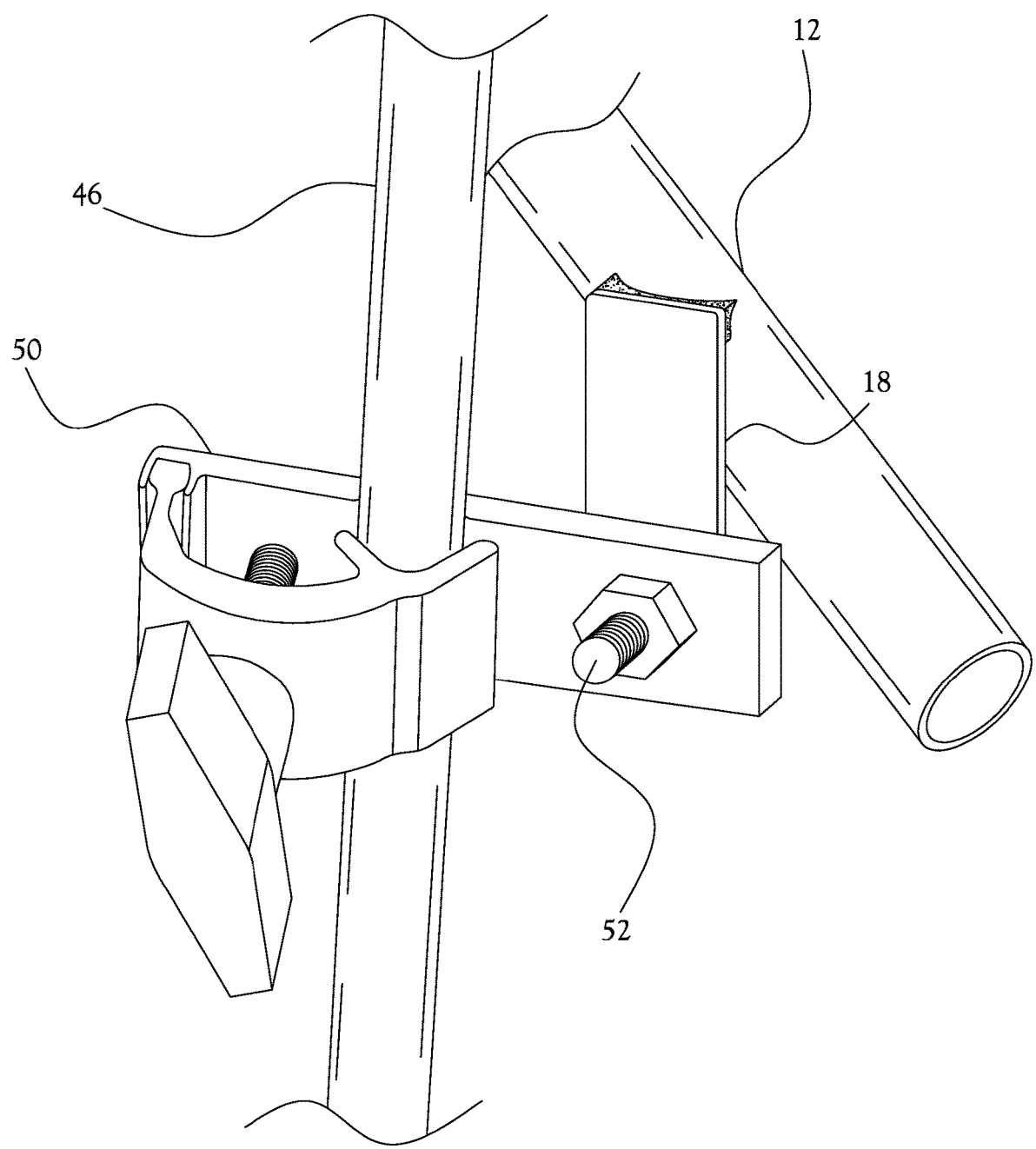
FIG. 4 illustrates a clamping assembly used to attach the multi-function attachment of FIG. 1 to a camping chair according to an example embodiment of the present general inventive concept.

FIG. 4 illustrates a clamping assembly used to attach the multi-function attachment of FIG. 1 to a camping chair according to an example embodiment of the present general inventive concept. As illustrated in this example embodiment, a clamping assembly 50 is coupled to the coupling member 18 by a bolt 52 received through a through hole 18 in the coupling member 18 and through a corresponding through hole in the clamping assembly 50. The clamping assembly 50 is then simply clamped to the frame member of the chair 46 and tightened to secure the arm member 12 in place. It is noted that this is simply one example of a device and method to clamp the arm member 12 to the chair 46, and a host of other arrangements may be employed to attach the attachment 10 to the chair 46 in various other example embodiments of the present general inventive concept. In the example embodiment illustrated in FIG. 4, the coupling member 18 is welded to a side portion of the arm member 12, but in various example embodiments the coupling member 18 may be adhered to the arm member 12 by other devices and/or methods, and may extend directly radially from and exterior point on the arm member 12 to make the attachment 10 more readily reversible so as to be easily attached to either side of the chair 46.

The components and arrangements illustrated in FIGS. 1-4 are merely an example embodiment of the present general inventive concept, and various other example embodiments may include different components and arrangements without departing from the scope of the present general inventive concept. In an example embodiment, an attachment may include an arm member having a telescopically adjustable member. The telescopically adjustable member may be formed with a first 1⅝ inch diameter steel pipe having a length of approximately 30 inches, with a first 1¼ inch diameter steel pipe having a length of approximately 24 inches received therein. An internally-threaded 3/16 inch diameter through hole may be provided along the wall of the first 1⅝ inch diameter pipe, and a correspondingly-sized externally-threaded bolt may be threadably received therein, such that the first 1¼ inch diameter pipe may be slid into and from within the first 1⅝ inch diameter pipe to a desired overall length of the telescopically adjustable member and may also be twisted in relation to the first 1⅝ inch diameter pipe. Thereafter the bolt may be tightened within the through hole, such that the telescopically adjustable member may be secured at the desired length and position. In various example embodiments a pair of steel straps may be wrapped around the external circumference of the first 1⅝ inch pipe at spaced-apart locations along the length thereof and may be fixed to the outer surface thereof, such as by weld, adhesive, or the like. As will be discussed in further detail below, these steel straps may be used in conjunction with a pair of clamps to secure the first 1⅝ inch pipe to corresponding support structures of a chair, thereby securing the arm member to a chair such that the overall length of the arm remains telescopically adjustable.

In such an example embodiment, a 90-degree elbow joint having a diameter of 1⅝ inches may be fitted at a first end thereof to a distal end of the first 1¼ inch pipe, opposite the first 1⅝ inch diameter pipe. A second 1¼ inch diameter pipe having a length of approximately 4½ inches may be fitted at a second end of the 90-degree elbow joint and may extend therefrom at an approximate 90-degree angle to the telescopically adjustable member. A second 1⅝ inch pipe may be provided having a length of approximately 8 inches, a first end slidably received over the second 1¼ inch diameter pipe, and a second end extending telescopically therefrom opposite the 90-degree elbow joint. Each of the first and second ends of the second 1⅝ inch diameter pipe may have, defined along the side wall of the pipe, an internally-threaded 3/16 inch diameter through hole with a correspondingly-sized bolt received therein, similar to that of the first 1⅝ inch pipe described above. Thus, by loosening and tightening the bolts in a manner similar to that described above, the second 1⅝ inch diameter pipe may be telescopically slid along the second 1¼ inch diameter pipe toward and away from the 90-degree elbow joint and twisted in relation to the second 1¼ inch diameter pipe, and then secured via the bolts at the desired position.

In various example embodiments, the arm member may include the above-discussed first and second 1⅝ inch diameter pipes, first and second 1¼ inch diameter pipes, the 90-degree elbow joint, and the associated straps, through openings, and bolts. It will be recognized that, with the first 1⅝ inch diameter pipe secured to a chair as will be discussed below, the telescopic adjustability of the components of the arm member allows the second end of the second 1⅝ inch pipe, which forms a distal end of the arm member, to be adjustable along three degrees of freedom in relation to the first 1⅝ inch diameter pipe, which forms a proximal end of the arm member. Those skilled in the art will recognize numerous other configurations and components which may be used to form the arm member such that a distal end of the arm member is adjustable along multiple degrees of freedom in relation to the proximal end of the arm member, and such other configurations and components may be used without departing from the spirit and scope of the present general inventive concept.

As discussed above, in various example embodiments constructed in accordance with the present general inventive concept, one or more devices may be disposed proximate a distal end of the arm member which may be used to assist a user in performing at least one of a variety of tasks. For example, a fishing rod mount may be provided proximate the second end of the second 1⅝ inch diameter pipe. More specifically, the fishing rod mount may include a third 1⅝ inch diameter pipe having an overall length of approximately 7 inches. A section of 1⅜ inch diameter pipe may be fixed at a first end thereof to an outer wall of the third 1⅝ inch diameter pipe, as by weld, adhesive, or the like, and may extend at an approximately 90-degree angle to the long dimension of the third 1⅝ inch diameter pipe. The 1⅜ inch diameter pipe may be received within the second end of the second 1⅝ inch diameter pipe, and the bolt of the through hole of the second end of the second 1⅝ inch diameter pipe may be tightened to fix the fishing rod mount in relation to the arm member distal end. Thus, with the attachment mounted to a chair, the fishing rod mount may be fixed to the arm member distal end and the positioning of the arm member distal end may be adjusted to position the fishing rod mount in relation to the chair such that the fishing rod mount is readily and conveniently positioned for use by a user seated in the chair.

In various example embodiments, a first end of the third 1⅝ inch diameter pipe may define a pair of U-shaped cutouts, or notches, defined on opposite circumferential sides of the pipe. The U-shaped cutouts may be configured such that a handle portion of a fishing rod may be received within the first end of the third 1⅝ inch diameter pipe, and the reel portion of the fishing rod may extend through one of the U-shaped cutouts, thereby steadying the fishing rod in relation to the third 1⅝ inch diameter pipe. In this way, a handle portion of a fishing rod may be conveniently placed within the third 1⅝ inch diameter pipe such that the fishing rod mount may carry the fishing rod for use by a user.

Numerous additional devices for use proximate the distal end of the arm member may be provided. For example, in an example embodiment, a shooting rest device may be provided including a length of V-shaped channel member and appropriate mounting members secured thereto such that the V-shaped channel member may be positioned in a configuration extending substantially horizontally, with the channel of the member facing upward. A firearm, such as a hunting rifle, may be rested within the channel of the V-shaped channel member, such that the V-shaped channel member may hold and carry the firearm. Thus, a user may operate the firearm with one hand while the firearm is carried by the shooting rest device in a convenient position in front of a user seated in the chair. In other embodiments, one or more additional devices, such as, for example, a cup holder, ash tray, flashlight holder, or the like, are mounted at various locations along the arm member such that, upon desired adjustment of the arm member, such devices may be positioned for convenient use by a user seated in the chair. In at least one example embodiment of the present general inventive concept, a vice may be provided which may be used to hold a work object, such as, for example, a fishhook, lure, or the like. In an example embodiment, the vice may be mounted along one of the arm member components, such as for example along the second 1⅝ inch diameter pipe.

In various example embodiments, at least one clamp, and preferably a pair of clamps, may be provided to allow the arm member to be secured to a chair. Similar to the illustrated embodiment, a pair of clamps may be provided, with each clamp comprising a pair of U-shaped members, each defining externally-threaded first and second ends thereof. Each clamp further may further include a plate defining four through holes therein, such that each U-shaped member first and second end may be received through a respective one of the holes of a corresponding through plate, and thereafter an internally threaded fastener, such as for example a nut or similar fastener, may be received onto a corresponding end of a corresponding U-shaped member to secure the U-shaped member in relation to the plate. In this way, each U-shaped member may be positioned to engage one of the above-discussed steel straps and/or the first 1⅝ inch diameter pipe, and also to engage a support member of a chair, to secure the first 1⅝ inch diameter pipe to the chair support member, thereby fixing the first 1⅝ inch diameter pipe in relation to the chair.

From the foregoing, it will be recognized that an attachment is provided which may be used in conjunction with one or more interchangeable devices to assist a user in performing various tasks. In various example embodiments, the attachment may be provided for securement to a chair as discussed above, or in some embodiments, a chair may be provided which incorporates the attachment. Those skilled in the art will recognize numerous configurations and devices which may be used to accomplish the present general inventive concept as described herein, and the present general inventive concept should not be limited to only those configurations and devices described in the present illustrative embodiments.

Various example embodiments of the present general inventive concept may provide a multi-function attachment to assist a user to perform one or more tasks, the attachment including an arm member having forward and back ends, one or more coupling members provided to the arm member and configured to detachable secure the arm member to a chair, and a support member configured to be detachably coupled to the second end of the arm member, wherein at least a portion of the support member is configured to extend laterally from a point proximate the front end of the arm member to provide support for a device forward and above a seat portion of the chair. A first coupling member may be provided proximate the back end of the arm member, and a second coupling member may be provided proximate the front end of the arm member. The attachment may further include a plurality of clamping members respectively secured to the first and second coupling members, and configured to clamp to a frame of the chair to fix the arm member in place. The first and second coupling members may be configured with through holes to respectively receive an attachment member to secure the clamping members to the first and second coupling members. The attachment may further include a positioning insert formed substantially in an L-shape and configured to couple the arm member to the support member at a plurality of positions, wherein the positioning insert may include a first portion configured to be inserted into the arm member, and a second portion configured to be inserted into the support member. The first portion of the positioning insert may be provided with a plurality of pairs of through holes along a length of the first portion, and the arm member may be provided with a pair of through holes configured to correspond with any of the pairs of through holes of the first portion of the positioning insert such that the positioning insert is arranged in one of a plurality of positions by receiving a pin through the through holes of the arm member and the first portion of the positioning insert. The first portion of the positioning insert may be provided with three pairs of the through holes along the length of the first portion such that the positioning insert is selectively positionable at three different lengths of insertion into the arm member. The second portion of the positioning insert may be provided with a pair of through holes, and the support member may be provided with a pair of through holes at a first end thereof to correspond with the pair of through holes in the second portion of the positioning insert such that the support member is secured to the second portion of the positioning insert by receiving a pin through the through holes of the support member and the second portion of the positioning insert. The attachment may further include a device holder having an inserting member extending from the device holder, the inserting member having a pair of through holes and configured to be inserted in the support member, wherein the support member may be provided with a pair of through holes at a second end thereof to correspond with the pair of through holes in the inserting portion of the device holder such that the device holder is secured in position relative to the support member by receiving a pin through the through holes of the support member and the inserting member. The arm member, positioning insert, support member, and device holder may be configured to be readily assembled/disassembled by inserting/removing the pins from the attachment. The device holder may be configured as a hollow and substantially tubular member to receive a handle of a fishing rod. The device holder may have a notch to receive a reel attachment to hold the fishing rod in place.

Various example embodiments of the present general inventive concept may provide a multi-function attachment for assisting in the performance of one or more tasks, said attachment including an arm member including a first end securable to a chair and a second end which is positionally adjustable in relation to the first end to position the second end proximate a user-positioning location of the chair, and at least one device securable to the arm member second end such that the device may be positioned above and forward of the user-positioning location of the chair for ready access by a user positioned at the location, the device being configured to assist a user in performing a task. The at least one device may include a fishing rod mount. The at least one device may further include a shooting rest. The at least one device may further include a vice. The arm member second end may be adjustable along three degrees of freedom.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A multi-function attachment to assist a user to perform one or more tasks, the attachment comprising:
   an arm member having forward and back ends;
   one or more coupling members provided to the arm member and configured to detachably secure the arm member to a chair; and
   a support member configured to be detachably coupled to the second end of the arm member;
   wherein at least a portion of the support member is configured to extend laterally from a point proximate the front end of the arm member to provide support for a device forward and above a seat portion of the chair;
   a positioning insert formed substantially in an L-shape and configured to couple the arm member to the support member at a plurality of positions;
   wherein the positioning insert includes a first portion configured to be inserted into the arm member, and a second portion configured to be inserted into the support member;
   wherein the first portion of the positioning insert is provided with a plurality of pairs of through holes along a length of the first portion;
   the arm member is provided with a pair of through holes configured to correspond with any of the pairs of through holes of the first portion of the positioning insert such that the positioning insert is arranged in one of a plurality of positions by receiving a pin through the through holes of the arm member and the first portion of the positioning insert;
   wherein the first portion of the positioning insert is provided with three pairs of the through holes along the length of the first portion such that the positioning insert is selectively positionable at three different lengths of insertion into the arm member;
   wherein the second portion of the positioning insert is provided with a pair of through holes; and
   the support member is provided with a pair of through holes at a first end thereof to correspond with the pair of through holes in the second portion of the positioning insert such that the support member is secured to the second portion of the positioning insert by receiving a pin through the through holes of the support member and the second portion of the positioning insert.

2. The attachment of claim 1, further comprising a device holder having an inserting member extending from the device holder, the inserting member having a pair of through holes and configured to be inserted in the support member;
   wherein the support member is provided with a pair of through holes at a second end thereof to correspond with the pair of through holes in the inserting portion of the device holder such that the device holder is secured in position relative to the support member by receiving a pin through the through holes of the support member and the inserting member.

* * * * *